United States Patent [19]

Jordan et al.

[11] 3,927,178

[45] Dec. 16, 1975

[54] SULFUR DIOXIDE REMOVAL FROM STACK GASES

[75] Inventors: John E. Jordan, Sheffield, Ala.; George M. Newcombe, Clifton, N.J.

[73] Assignee: The United States of America as represented by the Tennessee Valley Authority and the Environmental Protection Agency, Washington, D.C.

[22] Filed: Nov. 8, 1974

[21] Appl. No.: 522,372

Related U.S. Application Data

[63] Continuation of Ser. No. 313,251, Dec. 8, 1972, abandoned, which is a continuation of Ser. No. 243,636, April 13, 1972, now Defensive Publication No. T909,017.

[52] U.S. Cl. ............................................. 423/242
[51] Int. Cl.² .......................................... C01B 17/00
[58] Field of Search ............................ 423/242, 244

[56] References Cited
UNITED STATES PATENTS

| | | | |
|---|---|---|---|
| 2,405,747 | 8/1946 | Hixson et al. | 423/242 |
| 2,862,789 | 12/1958 | Burgess | 423/242 |
| 3,645,671 | 2/1972 | Griffin et al. | 423/242 |
| 3,676,059 | 7/1972 | Welty | 423/242 |
| 3,695,829 | 10/1972 | Griffin et al. | 423/242 |

*Primary Examiner*—Oscar R. Vertiz
*Assistant Examiner*—Gregory A. Heller
*Attorney, Agent, or Firm*—Robert A. Petrusek; B. H. Bochenek

[57] ABSTRACT

Sulfur oxides can be removed from waste gases by absorption in ammoniacal solution, treatment of the absorber effluent solution with ammonium bisulfate to release a concentrated stream of $SO_2$ suitable for conversion to $H_2SO_4$ or elemental sulfur, crystallization of the resulting ammonium sulfate from the stripped solution, and heating the ammonium sulfate to give ammonium bisulfate and ammonia for recycling. The process is improved by operating with a high content of ammonium sulfate in the absorbing solution and by adding the recycled ammonia to the stripped solution to promote crystallization of ammonium sulfate.

1 Claim, 3 Drawing Figures

Figure 1:
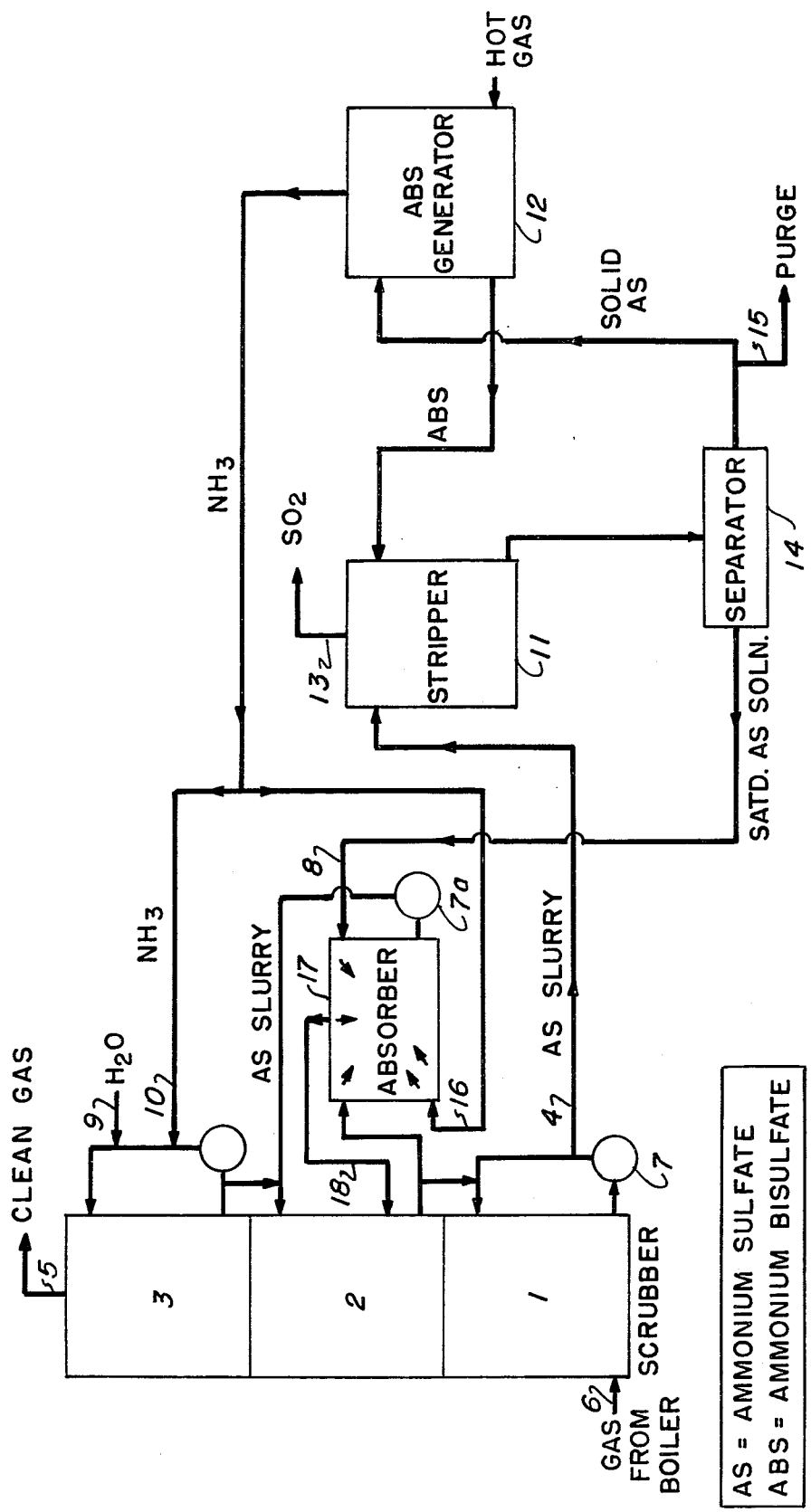

Fig. 1  ARRANGEMENT A

AS = AMMONIUM SULFATE
ABS = AMMONIUM BISULFATE

ARRANGEMENT B

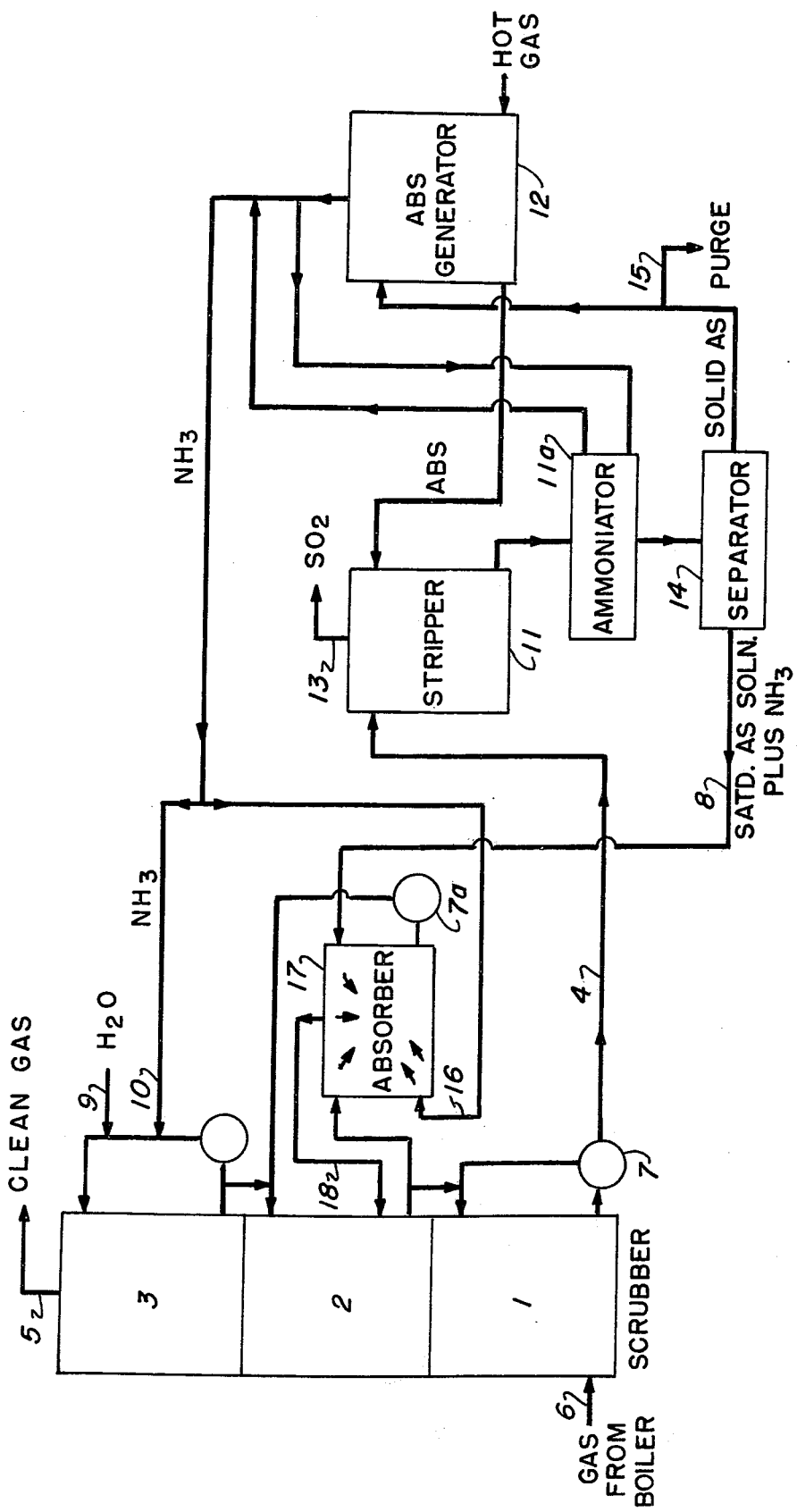
Fig. 3 ARRANGEMENT C

SULFUR DIOXIDE REMOVAL FROM STACK GASES

The invention herein described may be manufactured and used by or for the Government for governmental purposes without the payment to us of any royalty therefor.

This application is a continuation of our pending application Ser. No. 313,251 filed, Dec. 8, 1972, now abandoned, which is a continuation of Ser. No. 243,636, filed Apr. 13, 1972, for Sulfur Dioxide Removal from Stack Gases Now T909,017.

The present invention relates to an improved process for the elimination or substantial reduction of sulfur dioxide and sulfur trioxide from flue gases, and particularly from power plant stack gases by contacting such gases with an ammoniacal scrubbing solution, and more particularly to a process comprising a sequence of operations utilizing ammoniacal solutions for scrubbing such sulfur-laden gases whereby is accomplished the ultimate separation of salable sulfur products by a manner and means which substantially eliminate heretofore prohibitive energy and equipment requirements.

Of the various atmospheric pollutants, sulfur oxides are generally regarded to be some of the most serious. It is well known that most industrial fuels such as coal, gas, and oil contain sulfur, either in the form of elemental sulfur or sulfur compounds, and that when such fuels are burned, sulfur dioxide and sulfur trioxide are products of the combustion. These gases contaminate the atmosphere leading to a very undesirable condition and, along with nitrogen oxides, are suspected of being the principal offenders in the production of "smog" which now surrounds many industrial centers. It has been estimated that approximately 30 million tons of sulfur oxides are admitted to the atmosphere annually in this country alone, and that power plants contribute approximately one-half or 15 million tons of sulfur dioxide, which not only constitutes a severe pollution problem but also a deplorable loss of valuable natural resources. Although many approaches to solving the problems relating to the emission into the atmosphere of sulfur oxides have been considered including the use of low-sulfur fuel, fuel desulfurization, fuel gasification to make a clean fuel, and recovery of stack gases, the approach of treatment of the stack gases for several reasons appears to be the most promising.

Recovery of sulfur oxides (hereinafter referred to, for the sake of convenience, simply as sulfur dioxide) is quite difficult because of the low sulfur dioxide concentration (0.2–0.3 percent) and the high content of moisture and dust in the stack gases. The sulfur dioxide concentration is on the order of that in sulfuric acid plant tail gases, which tail gases, although they are clean and dry, have not heretofore been generally considered as containing enough sulfur from which economical recovery could be made.

A review of the literature suggests numerous processes which have been proposed for removing sulfur from flue gases, some of which are as follows: Solid absorbents such as sodium aluminate and manganese dioxide, molten alkali salts, absorbents such as activated carbon, aqueous solutions of ammonium and sodium salts, and slurries of metal oxides or hydroxides. In all of these processes of the prior art, the basic requirement and common denominator in that the scrubbing operation be as simple as possible: Otherwise, the tremendous volume of wet, dirty gas renders the recovery portion of the operation completely uneconomical.

Work on the sulfur dioxide problems started at TVA in August 1952, shortly after the construction of the agency's first major coal fired steam plant. With the advent of coal base power in the system and in view of the fact that much of the coal suitably located for use in the Tennessee Valley was high in sulfur content, it became obvious that sulfur dioxide emission was both a problem and an opportunity. The problem—impairment of air quality—could be alleviated at least at this point in history by the use of high stacks for dissipation and dilution into the atmosphere. The opportunity—recovery of a national resource that was otherwise being wasted—required development of economical recovery processes.

This earliest work was suspended after but a few years for a number of reasons including the poor economic prognosis. The most logical recovery products, sulfuric acid and elemental sulfur, were then in plentiful supply and selling at relatively low prices, so low in fact as to discourage in a major way any effort to recover sulfur values from gases containing only 0.2 to 0.3 percent sulfur dioxide. Beginning in about 1963, however, a period of sulfur shortage and increasing sulfur prices began and continued until just recently. These increasing prices were due in part to increasing production of products by the fertilizer industry, which industry accounts for approximately half of the sulfur consumption in this country. For instance, in making phosphate fertilizers, large tonnages of sulfuric acid are used in leaching the phosphorus values from phosphate rock ore. Increased production of phosphatic fertilizer products, particularly in the period of 1965–68 has been attributed in part to the exhausting of sulfur inventories and the inducement of a major world shortage during this period with a subsequent price increase from $24 per long ton in 1962 to about $42 per long ton in 1968.

In this situation, those segments of industry affected by the short supply of sulfur began to look for other sources. Thus, attention again was focused on power plant stack gases as a source of sulfur. At this time the situation was considerably different from that in the early 1950's: the rising price of sulfur had changed economics of sulfur dioxide recovery, the fertilizer industry in particular badly needed a new source of low-cost sulfur, and as was thought of at that time, a new factor had been introduced--the possibility that a permanent shortage of low-cost sulfur had developed. The last of these was particularly disconcerting for the fertilizer industry which has depended on cheap sulfur throughout its history even though temporary imbalances in supply and demand have brought the price up and down from time to time. There were also indications that the easily mined sulfur deposits were nearing exhaustion and that more expensive sources, either of sulfur compounds or of low-grade elemental sulfur deposits, would need to be depended upon in the future. In this situation, sulfur dioxide in stack gases took on a new importance as a national resource. Furthermore, and perhaps more importantly, because of the increasing size of individual fossil fuel burning power plants, the increasing total paper production and the depletion of low sulfur fuel supplies with the accompanying necessity of burning of higher sulfur content fuels, there was and is increased concern that the air-quality problem cannot be completely alleviated by building higher and higher stacks. The combination of this pollution factor and the changed economic situation led to a resumption of research in 1967 on sulfur dioxide recovery and/or elimination from coal-fired power plant stack gases. At the present time the price of sulfur on the world market is again at a very low level; however, in this day and age the aspect of environmental considerations is of the utmost, and accordingly, the alleviation or elimination of pollution, principally air pollution, by sulfur values in stack gases and the like has given rise to even greater impetus for finding solutions to these problems.

These studies relating to stack gas treatment processes generally fall into two classes--those in which the sulfur is recovered in a useful and salable form and those of the nonrecovery "throwaway" type. The throwaway methods, while giving no return to help offset operating cost, have oftentimes had the advantages of relative process simplicity and of avoiding the complexities of chemical product marketing. The major process studied of the throwaway type is use of a lime or limestone slurry as the absorbent agent. The resulting product, calcium sulfite or sulfate, is discarded. As to the other class of processes, i.e., those entailing recovery of the sulfur in useful and salable form, of the several materials that have been tried or proposed for absorption of these sulfur values, it is apparent that ammonia is the most effective. Used as an ammoniacal solution for washing the gas, it has adequate affinity for $SO_2$ and scaling in the scrubber (gas washer) is not a problem as in some other processes. Moreover, sulfate formation is not as great a problem. Sulfate is formed to some extent in any process because oxygen in the stack gas oxidizes part of the sulfite formed when the absorbent reacts with $SO_2$. In ammonia scrubbing, the ammonium sulfate formed by oxidation can be separated and sold as fertilizer, whereas sulfates from other processes, e.g., sodium sulfate or calcium sulfate, have little or no value and are quite difficult to regenerate.

Ammonia scrubbing produces a solution of ammonium sulfite and bisulfite [$(NH_4)_2SO_3$ and $NH_4HSO_3$], plus the ammonium sulfate [$(NH_4)_2SO_4$] formed by oxidation. Since the sulfites are not useful as such, it is desirable to subject them to some treatment that will produce a salable material. Several processes have been proposed for doing this, but most of them involve either high energy consumption or difficult operating problems. One of the more promising is that described by Hixon (U.S. Pat. No. 2,405,747, Aug. 13, 1946) in which the sulfite solution from the scrubber is reacted with ammonium bisulfate ($NH_4HSO_4$). Since the bisulfate is highly acidic, it reacts with the ammonia associated with the sulfites and thus releases a concentrated stream of $SO_2$ suitable for conversion to either sulfur or sulfuric acid by standard processes. The two reactions involved are:

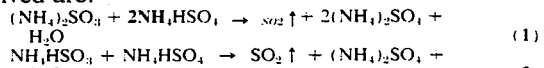

(1)

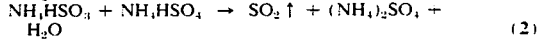

(2)

The $(NH_4)_2SO_4$ is then heated to about 700° F. to convert it back to $NH_4HSO_4$ for recycling:

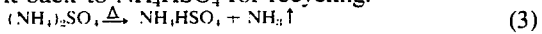

(3)

The $NH_4$ is recycled to the scrubber.

Although this process is promising and appears to have the lowest energy requirement of any of the alkali sulfite regeneration methods, there are some major problems involved in reducing it to engineering practice. One of these is arranging the scrubbing-regeneration system in such a way as to get the $(NH_4)_2SO_4$ separated from the solutions produced in reactions 1 and 2 without excessive consumption of energy. Unless solid $(NH_4)_2SO_4$ can be obtained and fed to reaction 3, energy requirement will be high for evaporation of water. Thus the object of this invention is to provide a sequence of operations that accomplishes separation of solid ammonium sulfate in such a way as to minimize both energy and equipment requirements.

ARRANGEMENT A - FIG. 1

A very simple and effective arrangement is shown in FIG. 1. As in most ammonia scrubbing processes, the scrubber is divided into three stages (1, 2, and 3), which are, in effect, three separate scrubbers. Most of the $SO_2$ is absorbed in stage 2; stage 1 is an $SO_2$-enriching stage, in which as much $SO_2$ as possible is driven into the solution, at the expense of scrubbing efficiency, to give a high $SO_2:NH_3$ mole ratio in the solution leaving the scrubber at 4 (to reduce ammonium bisulfate requirement by making bisulfite—reaction 2 versus reaction 1); and stage 3 is an ammonia recovery stage, where the solution is held at relatively low pH and salt content to minimize ammonia loss in the gas leaving the scrubber at 5.

Scrubbing of combustion gas from a coal-burning power plant is a typical $SO_2$ removal operation. In this case, the gas entering the scrubber at 6 typically contains 2,500 ppm. by volume (0.25 percent by volume) of $SO_2$. The gas comes in contact in 1 with ammonium sulfite-bisulfite solution that is recycled through 1 by pump 7 (to give an adequate amount of solution in contact with the gas). Part of the solution is withdrawn at 4 and passed to the regeneration equipment. An amount of solution equal to that withdrawn flows down into 1 from stage 2 above; this is called the "forward flow."

After passing through stage 1, the gas flows upward through stage 2, where the pH and solution concentration are adjusted to absorb most of the remaining $SO_2$. This solution is also recirculated through the scrubber stage (by pump 7a). Solution returning from the regeneration section is also introduced into stage 2 (at 3).

The gas then passes through stage 3 for ammonia absorption (although some residual $SO_2$ is also absorbed in this section) and out the scrubber. Makeup water (to replace that evaporated from the system by the incoming unsaturated gas and that lost by other means) is added at 9 and a small amount of ammonia at 10. The ammonia is added to provide an adequate amount of base in stage 3 to absorb the residual $SO_2$ in the gas from stage 2. Only enough is added to hold the pH at a level (about 5.8) conducive to good absorption of the ammonia escaping from stage 2.

The solution withdrawn from the scrubber at 4 is pumped to the stripper 11, where it is mixed with molten ammonia bisulfate (ABS) flowing from the ABS generator 12. Reactions 1 and 2 then occur and the $SO_2$ is released at 13; the $SO_2$ stream contains some water vapor which can be condensed out, if necessary, before conversion of the $SO_2$ to elemental sulfur or sulfuric acid by conventional methods.

The liquor leaving the stripper is a solution of ammonium sulfate (AS) with some sulfurous acid or undecomposed ammonium bisulfite. Although some crystallization of ammonium sulfate may occur in the stripper (depending on the sulfate content of the liquor entering the stripper), it was necessary in the previous practice to concentrate the stripper effluent solution by evaporating water in order to induce adequate crystallization of ammonium sulfate--which not only is expensive because of the energy requirement but also tends to decompose residual sulfite to undesirable side products such as thiosulfate and thionates. The methods of this invention, to be described, avoid these problems. In any case, however, a slurry of ammonium sulfate crystals enters separator 14. The separated wet crystals are conveyed to ABS generator 12 where the ammonium sulfate is heated to about 700° F. thereby driving off ammonia (reaction 3) and regenerating the ABS. The molten ABS (at about 300° F.) flows back to the stripper.

Part of the solid ammonium sulfate is removed at 15 to purge from the system the sulfate formed in the scrubber by oxidation.

The solution from separator 14 (stream 8) is returned to the scrubber through absorber 17 into stage 2. The ammonia released in the ABS generator is also returned, most of it entering scrubber stage 2 circulation loop at 16. Since the ammonia stream contains the combustion gas introduced for heating the ammonium sulfate in the ABS generator, the stream is scrubbed with the ammonium sulfate solution and scrubber solution in absorber 17. The unabsorbed combustion gas constituents pass out of the absorber and enter the scrubber at 18, thereby recovering any unabsorbed ammonia. It should be noted, however, that it is not essential to use combustion gas for decomposing the ammonium sulfate. If electrical heat, or indirect heating with combustion gas, is used, pure ammonia will be evolved and stream 18 will be unnecessary.

As noted above, operation by the method of this invention does not require evaporation and crystallization steps between stripper 11 and separator 14. Production of the required amount of crystals is accomplished by adjusting process conditions so as to induce crystallization throughout the equipment sequence 17, 2, 1, 11, and 14 (absorber, scrubber, stripper, and separator). Under such conditions the liquid phase is saturated with ammonium sulfate throughout the scrubber-stripper loop, although the concentration of dissolved ammonium sulfate will vary depending on pH and content of other salts. The key requirement is having enough crystals produced in the stripper to supply the amount needed for ABS generation and sulfate purging. The solubility relationships are such that this is not possible unless enough crystals enter the stripper in stream 4 to offset the effects of (1) increase in ammonium sulfate solubility resulting from decomposition of sulfites in the stripper and (2) formation of additional water by reactions 1 and 2.

By this means, the evaporator and crystallizer are eliminated and control of the system is simplified. At steady-state operation all that is necessary is to separate the crystals at 14 and purge enough to remove sulfate caused by oxidation. The rest of the system adjusts itself automatically in regard to solution composition and crystal content of the slurry.

Providing the desired amount of crystals in stream 4 is simple. The unit is started up with a charge of ammonia in the scrubber loops and solid ammonium sulfate (separate startup material) is fed to the ABS generator in the amount required for the stripper operation (reactions 1 and 2). As ammonium sulfate accumulates in the system, crystallization soon occurs and these crystals are cycled back to make up part of the generator feed. This is continued, with a continuously decreasing amount of startup ammonium sulfate feed, until the amount of crystals produced at 14 is more than enough for the ABS generator. The excess is then purged at 15 to prevent further accumulation of ammonium sulfate in the system. At this point the desired crystal content in stream 4 will have been reached automatically.

In practice, it is desirable to maintain a surge quantity of ammonium sulfate between the separator 14 and the generator 12 to simplify process control. The surge ammonium sulfate will grow in quantity because of oxidation; all that is needed is to occasionally remove part of it for sale or other means of disposal.

Although there are no crystals returned in stream 8, the crystals needed in stream 4 are induced in absorber 17 because of solubility changes resulting from mixing stream 8 with scrubber solution and the recycled ammonia. Changes in crystal:solution weight ratio may occur in scrubber sections 2 and 1, depending on process conditions, but these are automatically offset as the system reaches steady state if all crystals are removed in separator 14.

It should be noted that the return ammonia can be introduced directly into scrubber section 2 and thus eliminate absorber 17. Since this is likely to cause sulfite fume, however, the absorber is preferred.

ARRANGEMENT B - FIG. 2

Although process control is quite simple in arrangement A and plant cost is relatively low, there are mechanical difficulties in pumping a heavy slurry at 7 and 7A. This problem can be minimized by the arrangement shown in FIG. 2. The main change from arrangement A is that separation of the crystals is delayed until after the absorber, and a cooling step (7b) is introduced just before crystal separation. Thus, the return flow to stage 2 is a saturated solution ammonium sulfate rather than a crystal slurry.

Since the solution returned to stage 2 is saturated, there can be some crystallization in the scrubber. This depends on operating conditions which will vary with the individual situation. Factors favoring crystallization are (1) increase in sulfite:ammonia ratio (which decreases ammonium sulfate solubility) as the solution passes down through the scrubber and (2) oxidation of sulfite to sulfate in the scrubber (which depends on scrubber type and oxygen content of the gas). Offsetting these is the increase in ammonium sulfate solubility as the solution temperature increases when it reenters the scrubber after cooling at 7b. In any event, even if crystallization occurs, it should be relatively minor under normal operating conditions.

Startup and control of the system is similar to that in arrangement A. The startup supply of ammonium sulfate distributes itself auttomatically through the system until eventually the quantity of crystals removed at 14 is more than enough for the ABS generator. The feed of startup material is then stopped and solid ammonium sulfate begins to accumulate in the surge storage between the separator and the ABS generator. The surge tonnage is allowed to increase to a convenient size and ammonium sulfate is then removed from time to time for sale to prevent further increase.

ARRANGEMENT C — FIG. 3

If operating conditions are such that significant crystallization occurs in the scrubber in arrangement B, the arrangement shown in FIG. 3 can be used. In this system an ammoniator vessel 11a is added, in which part of the ammonia from the ABS generator is introduced into the slurry leaving the stripper. The solubility relationships in the $NH_3$ — $(NH_4)_2SO_4$ — $H_2O$ system are such that the added ammonia drastically reduces ammonium sulfate solubility and thereby induces crystallization. The ammonium sulfate crystallization can occur at two points, in the stripper and in the ammoniator; the amount occurring in the stripper depends on process conditions and can range from none to half or more of the ammonium sulfate required for feed to the ABS generator. Addition of ammonia then further decreases solubility, to the extent that enough ammonium sulfate can be crystallized from the ABS generator feed.

Although stream 8 is saturated with ammonium sulfate as in arrangement A (FIG. 1), the actual concentration is much lower because of the presence of the ammonia. Thus, in the absorber 17, where all the streams entering the scrubber come together and the ammonia is neutralized by bisulfates, a solution unsaturated in ammonium sulfate is produced. No crystallization will then occur in the scrubber if the ammonium sulfate in stream 8 has been kept at a low enough level by adding enough ammonia at 11a.

This system is not as easy to control as systems A and B. The operation is not fully automatic as in A and B, where the sulfate produced by oxidation accumulates and brings the system to a system to a steady state at which mere removal of all the crystals at a given point is an adequate control (plus feeding the correct amount of ammonium sulfate to the ABS generator and purging part of the accumulated crystals occasionally). In system C, a steady state must be reached at which the load of ammonium sulfate circulating through the absorber and scrubber is controlled at a level that prevents crystallization by keeping the solution unsaturated. In other words, sulfate removal must be kept ahead of sulfate formation rather than allowing sulfate to accumulate, as in A and B, until crystallization occurs and saturation automatically becomes the steady-state condition. It is necessary to set conditions in the stripper and ammoniator to crystallize out an amount of ammonium sulfate that will prevent crystallization in the absorber and scrubber.

Thus, at steady state, the concentration of ammonium sulfate in the separator-absorber-scrubber-stripper sequence will be below saturation at all points. The concentration will be lowest in stream 8 and highest in stream 4. Although sulfate is being formed by oxidation in the scrubber, it is removed at 14 (along with sulfate from the ABS) as fast as it is formed.

The system is automatic is that once conditions have been set at 11a to remove an adequate quantity of crystals, the ammonium sulfate concentrations in the absorber-scrubber system will adjust to some level below saturation at steady state. (Full saturation without crystallization in stream 4 might be obtained by careful control but probably would not be practicable.) If not enough crystals are removed at 14, the system will adjust as in arrangement A to a situation in which crystals are present in the absorber and scrubber at steady state.

The amount of ammonium sulfate removed at 14 can be adjusted by varying the proportion of the ammonia added at 11a. The amount of crystallization resulting from a given amount of ammonia added will vary with conditions in the rest of the system, which are affected by nonprocess factors such as scrubber type and concentration of $SO_2$, and $O_2$ in the inlet gas. Thus, the amount of ammonia used at 11a must be adjusted to the particular situation. Under typical conditions, on the order of half the ammonia evolved from the ABS generator will be adequate. More can be used, but the net result of this will be a steady state at which the ammonium sulfate concentration in the absorber and scrubber solutions will be relatively low. Although this is desirable in some respects, it tends to increase the degree of oxidation in the scrubber. The important consideration is to provide enough crystallization capability at 11a to keep the ammonium sulfate concentration in the absorber and scrubber liquors below saturation but not too far below.

In order that those skilled in the art may better understand how the present invention can be practiced and more fully and definitely understood, the following examples are given by way of illustration and not by way of limitation.

EXAMPLE I

Pilot plant operation has been carried out with a gas of the following composition.

| Constituent | Percent by volume |
|---|---|
| $SO_2$ | 0.25 |
| $CO_2$ | 12.6 |
| N | 74.6 |
| $O_2$ | 4.9 |
| $NO_x$ | 0.06 |
| $H_2O$ | 7.6 |

Figure 2:
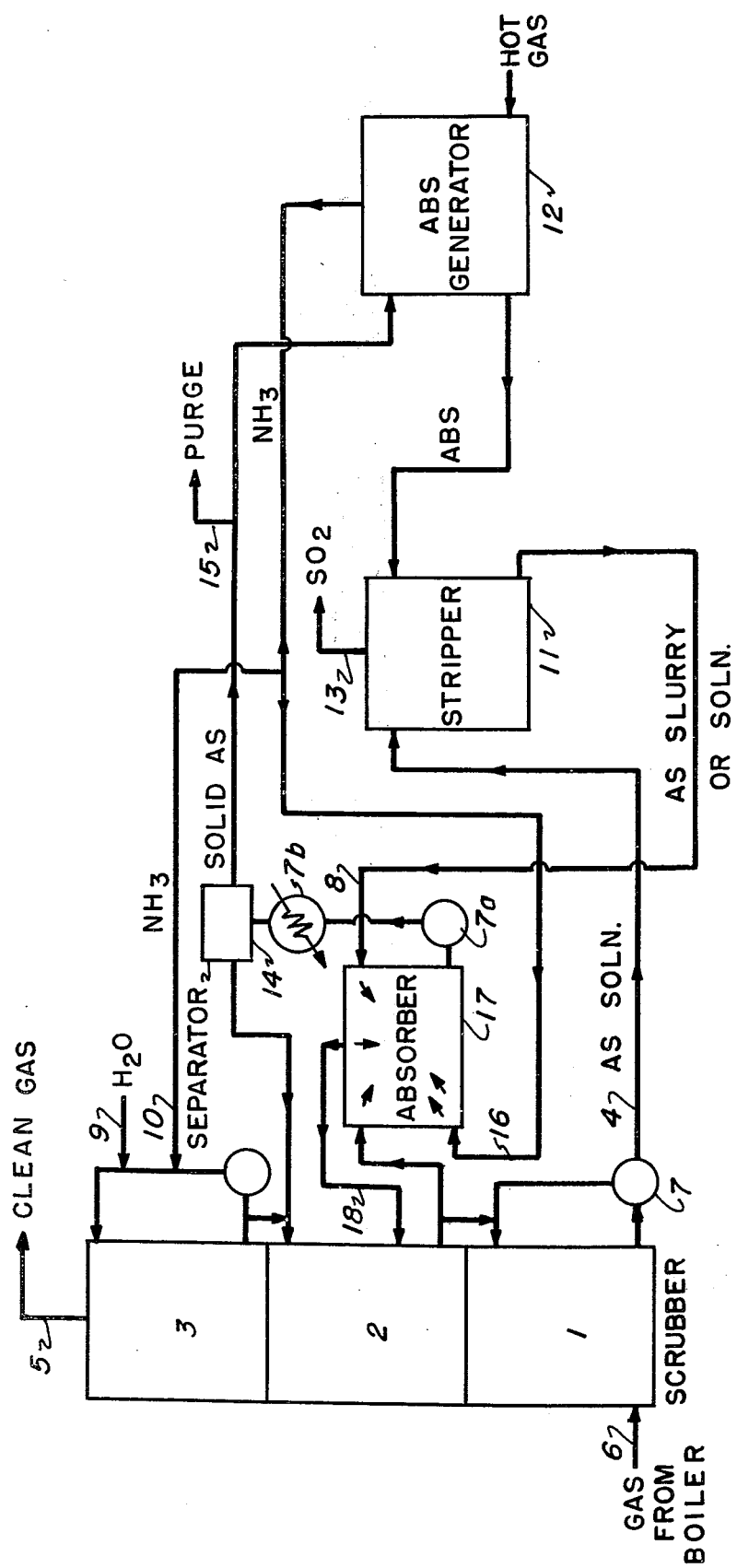

The scrubber, which had three stages as in FIGS. 1-3, was of the marble-bed type (trays with small glass spheres carried on the trays to increase gas-liquid contact). Typical operating conditions and results were as follows:

| | |
|---|---|
| Gas flow, cfm | 4000 at 300° F. |
| Inlet gas temperature, °F. | 300 |
| Liquor circulation rate, gpm | |
| Stage 1 | 25 |
| Stage 2 | 25 |
| Stage 3 | 25 |
| Forward flow from stage 2 to stage 1, gpm | 4.0 |
| S/C (moles sulfite S/mole $NH_3$ in sulfites) | |
| Stage 2 | 0.72 |
| Stage 1 | 0.80 |
| pH maintained in stage 3 | 5.8 |
| $SO_2$ removal, | 90 |
| $NH_3$ loss in clean gas, ppm | 50 |
| Oxidation, of $SO_2$ absorbed | 10 |

EXAMPLE II

Arrangement A:

At steady state, the forward flow slurry from stage 1 is stripped with ABS, giving an $SO_2$ flow at 13 of 5.3 cfm. The ABS requirement is 2.53 lb/min. Because of difficulty in disengaging all the $SO_2$, about 20 percent of that entering the stripper passes back to the absorber.

The amount of crystals separated at 14 is 3.1 lb/min. As noted above, a surge quantity is maintained and the excess removed for sale.

Mixing of the various streams in the absorber results in ammonium sulfate crystallization, giving a slurry containing about 3.7 percent crystals by weight. There are some changes in crystal content in stages 2 and 1 but these are not significant. The system adjusts automatically to give a quantity of crystals in stream 4 which, added to any formed in the stripper, is equal to the ABS and purge requirements.

EXAMPLE III

Arrangement B:
Operation is similar to system A except that stream 8 carries about 3.7 percent crystals by weight. Mixing of the various streams in the absorber, followed by cooling, produces further crystallization. At steady state, the amount of crystals separated at 14 is 3.1 lb/min, as in system A.

EXAMPLE IV

Arrangement C:
The quantity of crystals separated at 14 is again the same as in A and B. About half the recycled ammonia is added to the ammoniator. The stream 8 solution contains about 45 percent ammonium sulfate and 0.5 percent ammonia. Mixing of streams in the absorber produces a near-saturated solution of ammonium sulfate but no crystallization occurs until the solution reaches the stripper agin.

EXAMPLE V

The flowsheets shown in FIGS. 1-3 have been simplified somewhat to clarify the descriptions. Various additions or variations can be made depending on the balance desired between investment and operating cost and on other considerations that depend on the particular situation. These are obvious to anyone skilled in the art, however, and therefore have not been detailed herein. Examples are as follows:

1. Heat exchange equipment can be included. It is desirable to heat stream 4 by exchange with streams such as the ammonia leaving the ABS generator and the solution leaving the stripper. The heat of solution and neutralization of the ammonia can also be recovered, at or after the point it is developed. To get better driving force, it may be better to react the ammonia with the sidestream of the liquor circulating in stage 2 (rather than the full stream) in order to get higher solution temperature. In system A, stream 8 can be sent directly to the scrubber to reduce the solution volume in which the heats of ammonia absorption and reaction are generated.

2. Further cooling of the ammonia and absorbent liquor streams with cooling water can be used to improve ammonia absorption and thus reduce the amount of gaseous ammonia entering the scrubber. The latter aggravates fume formation, although fume can be reduced or eliminated by reducing pH in the scrubber liquor and by other means. As noted earlier, the absorber 17 can be omitted in the system A and C if fume is controlled by other means or can be tolerated.

3. The solution can be cooled at the appropriate points in systems A and C to increase ammonium sulfate crystallization as in B. This adds investment but has some advantages. The cooling can be omitted in system B, if desired, but at the risk of incurring crystallization in the scrubber.

4. Ammonia absorption can be improved by reacting it with solution from stage 1 rather than 2, since stage 1 liquor is more acidic. However, this interferes somewhat with scrubber operation; the reacted liquor would have to be pumped back to stage 2, in which case the resulting increasing in S/C at the top of stage 2 would increase $SO_2$ vapor pressure and reduce $SO_2$ scrubbing efficiency.

5. The amount of separate ammonium sulfate required for startup can be reduced by allowing sulfate formed by oxidation to supply part of the charge of sulfate required in the system at steady state. The startup will require a longer time, however.

6. The ABS:sulfite mole ratio can be varied. Overstoichiometric ABS feed gives more complete $SO_2$ stripping but requires more ammonium sulfate decomposition in the ABS generator.

7. The crystal separator can be one of several types, depending on the size of the crystals and the presence of other solids such as fly ash. Under some conditions, crystals can be grown large enough for simple screening, allowing any fine material to recycle back to the absorber or scrubber. If conditions are such that only fine crystals can be produced, more complicated and expensive methods of separation must be used.

8. Evaporation can be used to assist in ammonium sulfate crystallization in any of the systems. However, this would not be logical in systems A and B, and in C the investment and operating cost make it quite undesirable.

What we claim as new and desire to secure by letters patent of the United States is:

1. A closed loop process for removing $SO_2$ from waste gases comprising the steps of:
   A. scrubbing said waste gases in a scrubber with a liquor comprosing a solution of ammonium sulfite, ammonium bisulfite, and ammonium sulfate;
   b. transferring liquor that results from the scrubbing in step (a) supra to a stripper means;
   c. adding to the liquor in said stripper ammonium bisulfate in sufficient quantity to cause removal of $SO_2$ from said liquor and formation of an ammonium sulfate slurry;
   d. mixing said ammonium sulfate slurry formed in step (c) with gaseous ammonia evolved as described in step (h), infra, and a portion of the scrubber liquor, in an absorber means, so as to depress the solubility of ammonium sulfate in the resultant liquor and cause ammonium sulfate precipitate to form, said formation of said ammonium sulfate precipitate being effected without the addition of substantial amounts of external heat energy applied thereto for purposes of evaporating water therefrom;
   e. cooling the resultant slurry to further depress the solubility of ammonium sulfate in the resultant liquor from step (d);
   f. separating the cooled slurry into solid ammonium sulfate and liquid component;
   g. recycling the liquid component to the scrubber;
   h. converting the solid ammonium sulfate to ammonium bisulfate and gaseous ammonia;
   i. recycling a portion of said ammonia to said absorber in step (d), and a portion to said scrubber.

* * * * *